Patented June 14, 1932

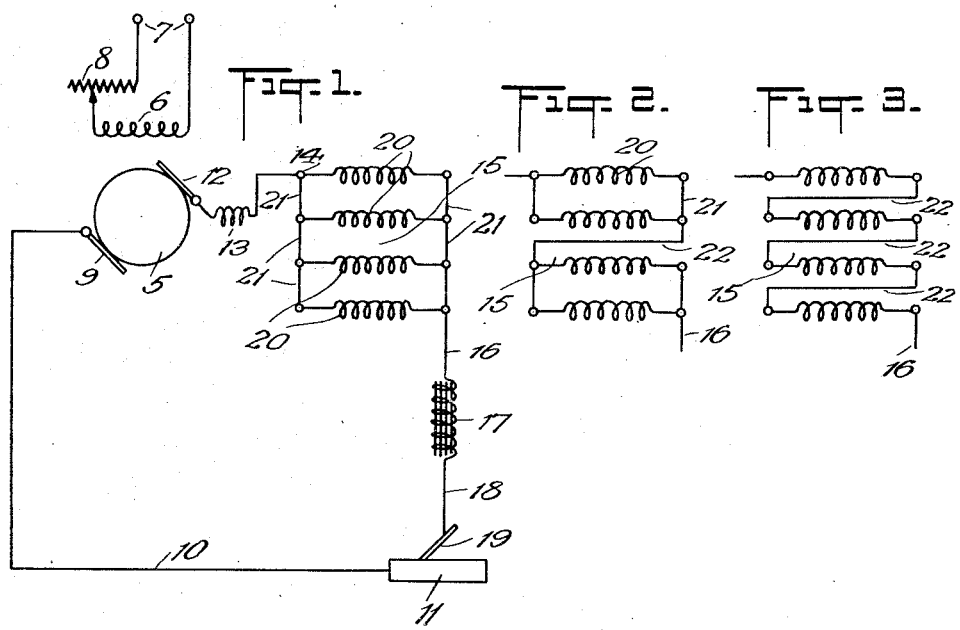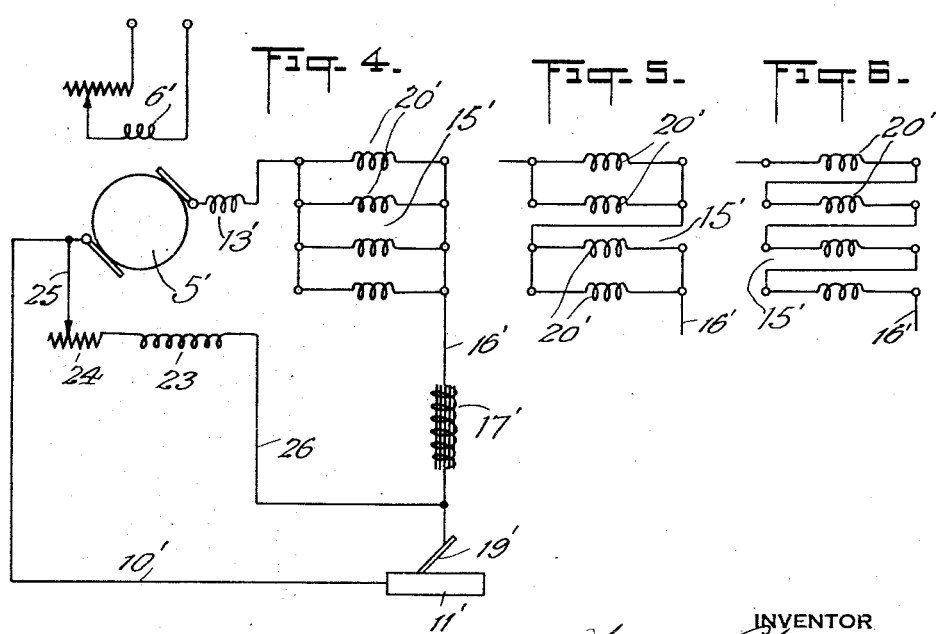

1,862,922

UNITED STATES PATENT OFFICE

ALEXANDER CHURCHWARD, OF NEW YORK, N. Y., ASSIGNOR TO WILSON WELDER & METALS COMPANY, INC., OF HOBOKEN, NEW JERSEY, A CORPORATION OF NEW YORK

WELDING GENERATOR

Application filed January 8, 1930. Serial No. 419,268.

The present invention relates to arc welding generators, and more particularly to direct current welding generators of the type having a separately excited field and a bucking series field.

An object of the invention is to reduce the resistance losses inherent in a welding generator of the type referred to, at the various welding currents which the generator may be required to deliver.

Another object of the invention is to provide, in connection with such a type of generator, stability of the arc at the work over a wide range of welding current values, without the necessity of using a large reactance, external to the generator, which heretofore has been a general requirement in welding circuits.

In certain classes of welding generators, a separately excited field is used to create the necessary striking voltage or open circuit voltage before the arc is struck, and a bucking series field is used to obtain a drooping characteristic curve of voltage and current. When a variable shunt resistance is used across the bucking series field for obtaining various selected welding current values, the desired effect of the bucking series field is adjusted by varying this shunt resistance. The losses involved in said shunt resistance are large, particularly at high welding current values. As an illustration, a series field to produce the desired bucking effect for a range of welding current values between 75 and 300 amperes, would have, say, 96 total turns, with a resistance of, say, .084 ohms. When welding at a minimum current value of 75 amperes, with no shunt across the series field, the loss in the series field is then .084 × 75² or 472 watts. When welding at a maximum current value of 300 amperes, the current through the shunt resistance of .028 ohms across the series field winding is 225 amperes, and the total loss in the shunt resistance and the series field windings is 472 + .028 × 225² or 1,890 watts. A welding generator, delivering the aforesaid range of current output, would be driven by a 10 horse power motor; and it is at once seen that approximately 25% of the motor capacity is taken up in losses when welding at full load. Furthermore, because the shunt used across the series winding is non-inductive, there is little inductive effect due to the series-windings to steady the arc at the work, with the result that a comparatively large and costly reactance has to be used in circuit with the generator.

In accordance with the present invention, a desired degree of welding current regulation is obtained without having the excessive losses encountered in shunting a bucking series field, and the full benefit of the inductive effect of the bucking series winding is preserved, the use of a shunt resistance across the bucking series field being eliminated and the use of an external reactance of very small size being possible in the welding circuit for maintaining arc stability at the work. The aforesaid results are obtained by providing a plurality of bucking series windings, adapted to be arranged in series, series-parallel or parallel, in such a way that for any combination of connection the desired effect of a bucking series field is produced.

The invention will be understood from the following description, taken in connection with the accompanying drawing in which Fig. 1 shows diagrammatically a welding circuit supplied by a welding generator embodying the invention with four bucking series field windings connected in parallel; Fig. 2 shows said series field windings connected in series-parallel relation; Fig. 3 shows said series field windings connected in series relation; and Figs. 4, 5 and 6 are views similar to Figs. 1, 2 and 3, in which the invention is shown adapted for use in connection with an additional field excited by the voltage across the arc.

Referring to Fig. 1, 5 indicates the armature of a direct current generator having a field winding 6 separately excited from an independent source of electrical energy 7 and capable of being regulated by the adjustable rheostat 8. One of the brushes 9 of the armature 5 is connected by a conductor 10 to the work 11. The other brush 12 of the armature 5 is in electrical connection through the interpole series windings 13, the bucking series field 15, a conductor 16, a reactance unit 17, and a conductor 18, with the welding electrode 19 on the work 11.

In the drawing, the bucking series field 15 is shown as consisting of four windings 20; and, in a four pole generator, one of these windings 20 can conveniently be placed on each of the four poles of the generator. It is understood, however, that the invention may be adapted to any number of bucking series field windings and to any number of generator poles, as will become apparent by the later description. A shunt resistance across the bucking series field is not used, and, in the particular embodiment of the invention shown in the drawing, three selected welding current values may be obtained by three possible combinations of connection of the four windings 20 with relation to one another, any convenient manually operated switching means (not shown) being used for effecting the change in connections. Thus, in Fig. 1 the four windings 20 are all connected in parallel by the conductors 21; in Fig. 2 two pairs of windings 20 each connected in parallel are connected in series by a conductor 22; and in Fig. 3, the four windings 20 are all connected in series by the conductors 22.

It now becomes apparent that with the parallel arrangement of the windings 15 shown in Fig. 1, the generator will deliver its maximum welding current output; that with the series parallel arrangement shown in Fig. 2 the generator will deliver approximately one-half of its maximum output; that with the series arrangement shown in Fig. 3 the generator will deliver approximately one-quarter of its maximum output; and that the same desired effect of bucking series ampere-turns is maintained in each of the three arrangements.

As an illustration of the low resistance losses made possible by the invention, let us assume the same range requirement of welding current values, 75 to 300 amperes, as previously exemplified in connection with a generator having a shunt resistance across its bucking series field. Let us also assume that the total resistance of the field 15, or of the four windings 20 in series arrangement, is as before, .084 ohms. The resistance of each winding 20 is thus one-quarter of .084 ohms, or .021 ohms. By observing that, for any of the three assumed welding current values, 75, 150 and 300 amperes, provided by the three arrangements of the windings 20, the current in any winding 20 is always the same, that is 75 amperes, then the total resistance loss in the field 15, at any of the three assumed values of welding current, is four times the product $.021 \times 75^2$, or 472 watts, which is the minimum loss in a generator using a shunt resistance across its series field, as hereinbefore explained. Thus, at full load, the resistance loss is 472 watts, as compared to 1890 watts, which is the maximum loss when using a shunt resistance across the series field, as hereinbefore explained.

The use of an inductive reactance in arc welding circuits for obtaining arc stability at the work is well known in the art of electric welding. It is a fact that an inductive reactance if designed for use at a moderate current, say 150 amperes, is not as suitable for use at a lower current, say 75 amperes; and if a reactance is provided with enough turns to serve its function with a welding current of 75 amperes and yet is capable of carrying the maximum output of the generator, say 300 amperes, the copper in said reactance has to be of comparatively large cross section and the reactance is therefore costly. Moreover, too large a reactance is detrimental to the making of good welds. A single reactance for use at all welding currents would probably be too great when welding at say 150 amperes or over, because an unskillful operator using a long flexible arc, such as is given by apparatus of the kind described, will carelessly draw too long an arc, if the reactance is too large, thereby causing porous and burnt welds.

From the above, it is seen that a single or fixed reactance for use at all welding currents is objectionable, particularly if the welding apparatus is required to deliver a wide range of welding currents. Thus, for obtaining arc stability at the work, a variation of inductance in the welding circuit corresponding to the variation of welding current is desirable. This inductance variation should be such that the ampere-turn effect in the welding circuit remains constant at all welding currents.

Since the present invention eliminates the use of a shunt resistance across the bucking series field, the inductive effect of this field in the welding circuit is preserved at all welding currents. Thus, the bucking series field is utilized to maintain arc stability at the work at all welding currents. When the generator is delivering its maximum welding current, the field windings 20 are connected in parallel, and their effective inductance is then a minimum. When the generator is delivering one quarter of its maximum welding current, the windings 20 are connected in series and their effective inductance is then a maximum. When the generator is delivering one half of its maximum welding current, the inductance of the field windings 20 connected in series parallel is then a value between the maximum and minimum values of said windings. The above noted variation in the effective inductance of the field 15 is such that the ampere-turn effect of said field 15 remains constant at all three assumed welding currents provided by the three arrangements of the windings 20. This can be readily understood by observing that the current in each winding 20 is always the same, that is 75 amperes, for any of the three assumed welding currents. Thus, assuming the same 96 total turns for the series field 15, as in the examples given hereinbefore, the number of turns in each winding 20 is 24; and the ampere-turn reactive effect of the field 15 in the welding circuit at all three welding currents is always four times the product 75×24 or 7200 ampere-turns. This described variation of the inductance value of the field 15 with welding current is, as hereinbefore pointed out, the particular variation of inductance providing most efficient means for obtaining arc stability at the work over a range of welding currents. Since the inductance of a winding 20 is an appreciable value, it therefore follows that the present invention has utility in providing arc stability at any selected welding current without the requirement of a large external reactance in the welding circuit, i. e. with the possible use of an additional external fixed reactance 17, if required, of comparatively small size.

Figs. 4, 5 and 6 show the invention adapted for use in connection with a separately excited generator having an additional shunt field. The welding generator, shown in these figures, has, in addition to the separately excited field 6', the bucking series field 15' and the interpole field 13', a shunt field 23 connected by the conductor 25 to the conductor 10' which connects one of the brushes of the armature 5' to the work 11', and by the conductor 26 to the electrode 19'. This shunt field 23 may be adjusted by the variable resistance 24. This generator also comprises the same arrangements of bucking series field windings 20' as hereinbefore described, and a reactance 17', of comparatively small size, may be used in the welding circuit.

Thus, the various arrangements of the series windings 20' again make possible a variation of the welding current with minimum resistance losses, and again provide most efficient means for obtaining arc stability at the work. It is noted, however, that the resistance losses in the windings 20' are smaller than when a single separately excited field 6 is used. This may be understood by observing that the self-excited shunt field 23 and the bucking series field 15' both function to lower the voltage of the generator from open-circuit to welding conditions. Thus, the field 15' need not produce as large a bucking ampere-turn effect as when separate constant excitation is used, and the turns of the windings 20' may be made correspondingly less in number. As an example, let us assume a requirement of 60 volts as the open circuit voltage of the generator and that the field 6' and the field 23 each contribute 30 volts toward this open circuit voltage. When not welding, the voltage across the field 23 is 60 volts and when welding it is that of the voltage across the arc, say 20 volts. Thus when welding, the ampere-turns in the field 23 are one-third the value when not welding, and correspondingly the field 23, when welding, provides one-third of the voltage which said field 23 provides when not welding, i. e., 10 volts, as part of the generator voltage. With the field 6' still providing 30 volts when welding, the ampere-turn effect of the bucking series field 15' only needs to lower the voltage from approximately 40 to 20 volts instead of from 60 to 20 volts when a single separately excited field 6 is used. The required turns in the field 15' are therefore approximately one-half of those needed when separate excitation is used, and the resistance losses in the windings 20' are made correspondingly lower. It is noted that the same desired high open circuit or striking voltage is produced for any arrangement of the series windings 20'.

From the above it will become apparent to those skilled in the art that I have provided simple and reliable means whereby arc stability may be maintained at all welding currents, in the absence of heavy external reactances, and welding circuit and generator losses may be considerably reduced.

What I claim is:

1. For use in an electric arc welding circuit, a direct current welding generator having a separately excited field winding and a plurality of bucking series field windings arranged for series and parallel connection in the welding circuit, whereby the welding current may be varied and the inductive effect in the welding circuit of said series field windings may be oppositely varied while maintaining substantially constant the ampere-turn effect of said series field windings.

2. For use in an electric arc welding circuit, a direct current welding generator having a separately excited field winding and a plurality of bucking series field windings arranged for series, series-parallel and parallel connection in the welding circuit, whereby the welding current may be varied and the inductive effect in the welding circuit of said series field windings may be oppositely varied while maintaining substantially constant the ampere-turn effect of said series field windings.

In testimony whereof, I have affixed my signature to this specification.

ALEXANDER CHURCHWARD.